United States Patent
Jensen

(10) Patent No.: US 11,774,278 B2
(45) Date of Patent: Oct. 3, 2023

(54) REDUCE MEASUREMENT JITTER IN RESONATING SENSORS

(71) Applicant: Halliburton Energy Services, Inc., Houston, TX (US)

(72) Inventor: Karl Andrew Jensen, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 355 days.

(21) Appl. No.: 16/951,826

(22) Filed: Nov. 18, 2020

(65) Prior Publication Data

US 2021/0156733 A1 May 27, 2021

Related U.S. Application Data

(60) Provisional application No. 62/938,764, filed on Nov. 21, 2019.

(51) Int. Cl.
| | |
|---|---|
| G01H 3/00 | (2006.01) |
| G01H 3/06 | (2006.01) |
| *E21B 47/12* | (2012.01) |
| *G01H 3/12* | (2006.01) |

(52) U.S. Cl.
CPC ............ G01H 3/005 (2013.01); G01H 3/06 (2013.01); *E21B 47/12* (2013.01); *G01H 3/12* (2013.01)

(58) Field of Classification Search
CPC . G01H 3/005; G01H 3/12; G01H 3/06; E21B 47/12; E21B 47/06; G01K 7/32; G01L 9/0008

USPC .......................................................... 367/13
See application file for complete search history.

(56) References Cited

U.S. PATENT DOCUMENTS

| | | |
|---|---|---|
| 2,872,579 A | 2/1959 | Kihn |
| 7,779,690 B2 | 8/2010 | Jacobsen et al. |
| 8,390,471 B2 | 3/2013 | Coates et al. |
| 8,406,356 B2 | 3/2013 | Hollis |
| 2008/0061789 A1 | 3/2008 | Coates et al. |
| 2008/0184800 A1 | 8/2008 | Jacobsen et al. |
| 2008/0304557 A1 | 12/2008 | Hollis |
| 2012/0121059 A1* | 5/2012 | Kim ...................... G01H 13/00 377/19 |
| 2017/0198571 A1 | 7/2017 | Chimakurthy |

FOREIGN PATENT DOCUMENTS

WO 2009089150 A2 7/2009

* cited by examiner

*Primary Examiner* — Daniel L Murphy
(74) *Attorney, Agent, or Firm* — Scott Richardson; Parker Justiss, P.C.

(57) ABSTRACT

This disclosure presents methods and systems to reduce measurement jitter of a resonating element. A time control is utilized to analyze the phase of a received frequency from the resonating element. Using that analysis, the time control can determine a next time point to direct the re-excitation of the resonating element. Through controlling when the resonating element is electrically excited, the measurement analyzer can determine a pressure or temperature at the location of the resonating element while accounting for remaining resonating energy from previous electrical excitations. The method and system can allow for measurements to be taken at a significantly faster rate while reducing uncertainty, e.g., jitter, in the collected measurements.

20 Claims, 8 Drawing Sheets

REDUCE MEASUREMENT JITTER IN RESONATING SENSORS

CROSS-REFERENCE TO RELATED APPLICATION

This application claims the benefit of U.S. Provisional Application Ser. No. 62/938,764, filed on Nov. 21, 2019, and entitled "REDUCE MEASUREMENT JITTER IN RESONATING SENSORS," commonly assigned with this application and incorporated herein by reference in its entirety.

TECHNICAL FIELD

This application is directed, in general, to an electrical resonating wire sensor (RWS) and, more specifically, to controlling the electrical excitation of the resonating element.

BACKGROUND

Resonating wire sensors (RWSs) and similar devices are commonly used in the hydrocarbon industry to measure pressure and temperature downhole in a borehole. In applications where the pressure or temperature changes over the course of hours, existing RWS designs can produce adequate results. In this scenario, the time interval of measurement collection can be sufficient so that the resonating element has time to come to a complete rest prior to a subsequent measurement. In other scenarios measurements may need to be taken at a higher frequency such that the resonating element may not have time to return to a complete rest prior to a subsequent measurement. Measurements taken while the resonating element has energy from a previous measurement cycle can lead to increased jitter or a wider deviation in measurements collected. This can lead to higher inaccuracy in pressure or temperature measurements.

SUMMARY

In one aspect, a method of directing an electrical resonating wire sensor (RWS) in a well system is disclosed. In one embodiment, the method includes: (1) initiating an excitation of a resonating element of the RWS utilizing received operating parameters, (2) receiving a measurement generated by the resonating element, and (3) employing a time control to set a time interval operable to initiate a subsequent excitation of the resonating element, wherein the time interval is determined using an analysis of the measurement.

In a second aspect, a system to direct an electrical RWS in a well system is disclosed. In one embodiment, the system includes: (1) a resonating element, capable of receiving electrical energy, located in the well system, (2) an acquisition circuitry, capable of measuring a frequency, a phase, and an amplitude of the resonating element, (3) an excitation circuitry, capable of transmitting electrical energy to the resonating element, and (4) a time controller, capable of determining a time interval for the excitation circuitry to transmit electrical energy utilizing received operating parameters.

In a third aspect, a computer program product having a series of operating instructions stored on a non-transitory computer-readable medium that directs a data processing apparatus when executed thereby to perform operations to direct an electrical RWS in a well system is disclosed. In one embodiment, the operations include (1) initiating an excitation of a resonating element of the RWS utilizing received operating parameters, (2) receiving a measurement generated by the resonating element, and (3) employing a time control to set a time interval operable to initiate a subsequent excitation of the resonating element, wherein the time interval is determined using an analysis of the measurement.

BRIEF DESCRIPTION

Reference is now made to the following descriptions taken in conjunction with the accompanying drawings, in which.

DETAILED DESCRIPTION

Figure 1:
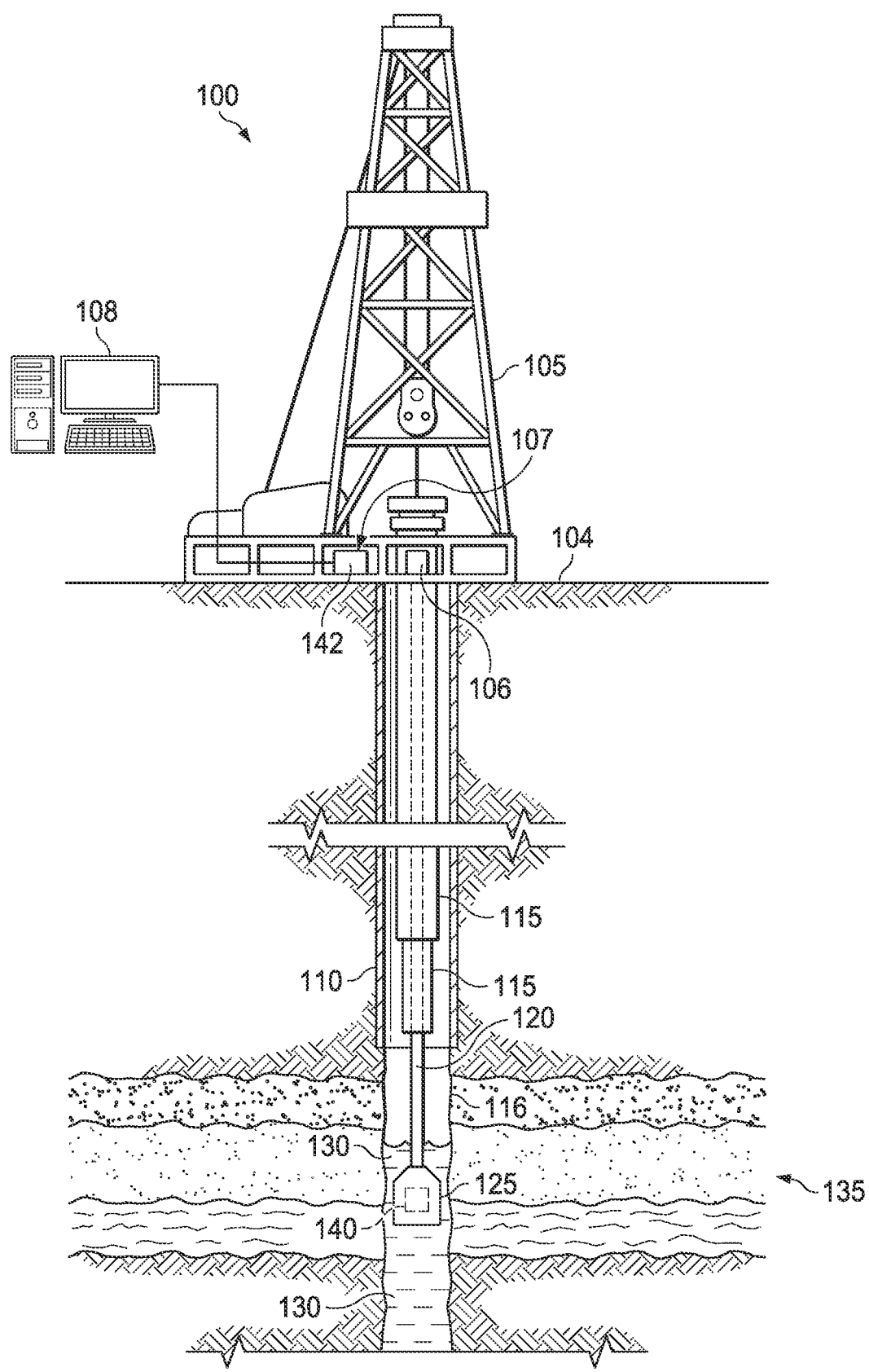
FIG. 1 is an illustration of a diagram of an example well system with a resonating wire sensor (RWS)

Resonating wire sensors (RWSs), and other resonating sensor technologies, such as vibrating beams, can be used to measure pressure and temperature. For example, RWSs can be used in a downhole or borehole environment, such as in use by hydrocarbon production purposes, mining purposes, scientific purposes, or other borehole applications. RWSs can be located, for example, on production tubing or casing in various environments, where such environments can include, but are not limited to, unconventional field applications or mature-field applications, as well as in hydrocarbon well systems including single-zone, multi-zone, drilling, development, production, injection, intercept, observation, and other hydrocarbon well systems. RWSs can be suitable for ultra-high temperature environments, such as geothermal, or other physical environments.

A RWS, for example, an electrical resonance diaphragm, typically contains resonating wires, e.g., resonating elements, that can be measured to determine conditions at a RWS location. Rapid measurement of such sensors allows for higher temporal resolution of the measurement. Measurements can be performed by inducing simple harmonic motion, e.g., excitation, into a wire suspended between two anchor points, and then measuring the resonant frequency of the wire. Signal transduction can be performed by allowing the measurand to influence the resonance of that wire, typically, but not limited to, the tension. Other types and designs of RWSs can be utilized with this disclosure.

When examining the response of such sensors with high spectral accuracy, the excitation induces shifts in the tension of the wire. This differs from the conventional first order analysis, as at high spectral accuracy, the small signal approximation of such analysis is violated. The impact of these shifts can be sustained until the wire has returned to a rest state. If subsequent excitations occur before returning to the rest state, the resonant frequency can be unpredictable, e.g., jitter in the measurements—larger deviation of collected measurements, due to residual energy stored in the wire.

This disclosure presents methods and systems to use a time control to time subsequent electrical excitations of the resonating element so that a predictable energy value can be achieved, such as including residual kinetic energy remaining in the motion of the wire and potential energy in the deformation of the wire. In some aspects, the measured voltage signal amplitude of the resonating element can be used as a proxy for the amount of the energy value. With a deterministic amount of the energy value, the measurement to measurement variation of the voltage signal frequency can be reduced, improving accuracy and stability at sampling rates where the inter-sample gap is insufficient to allow the resonating element to return to a rest state.

In addition to the hydrocarbon production industry, the disclosed methods and systems can also be applied in other industries and fields. For example, another field is nuclear where highly precise and reliable pressure and temperature measurements would be beneficial. Utilizing a process as described herein can help achieve the prescribed metrics.

Turning now to the figures, FIG. 1 is an illustration of a diagram of an example well system 100 with a RWS. Well system 100 can be an extraction system, a production system, or another type of hydrocarbon well system. Well system 100 includes a derrick 105, a well site controller 107, a surface pump system 106, and a computing system 108. Well site controller 107 includes a processor and a memory and is configured to direct operation of well system 100. Derrick 105 is located at a surface 104.

Extending below derrick 105 is a borehole 110, with two cased sections 115 and one uncased section 116. A fluid pipe 120 is inserted in borehole 110. Located at the bottom of fluid pipe 120 is a downhole tool 125. Downhole tool 125 can include various downhole components including a RWS 140. Other components of downhole tool 125 can be present, such as a local power supply, or batteries and capacitors to store power received from another system, as well as a transceiver and a control system. Borehole 110 is surrounded by subterranean formation 135. Connecting surface pump system 106 and downhole tool 125 is fluid pipe 120. Located with surface pump system 106 or well site controller 107 is a RWS controller 142. RWS controller 142 and RWS 140 can be used to perform the methods described herein.

In this example, RWS 140 can include a resonating element that can be electrically excited using a downhole power supply or a power supply located at the surface. A surface power supply can be transmitted via a wire, cable, or through a pipe. As well system 100 operates, the pressure or temperature can change within borehole 110, such as when pumping fluid 130 into or out of borehole 110, or when outside processes in subterranean formation 135 cause a change. RWS 140 can measure the change in pressure or temperature using the resonating element and the measured frequency can be transmitted to RWS controller 142 for further analysis, including providing the measurements and analysis to the time control of RWS controller 142. Fluid 130 can include mud, sand, brine, water, oil, gas, chemicals, and other types of fluids, additives, and hydrocarbons present in borehole operations.

In some aspects, computing system 108 or well site controller 107 can be utilized as RWS controller 142 and to implement the time control. Computing system 108 can be proximate well site controller 107 or be a distance away, such as in a cloud environment, a data center, a lab, or a corporate office. In an alternative aspect, RWS controller 142, with the time control can be located at the well head, or located downhole with RWS 140.

Figure 2:
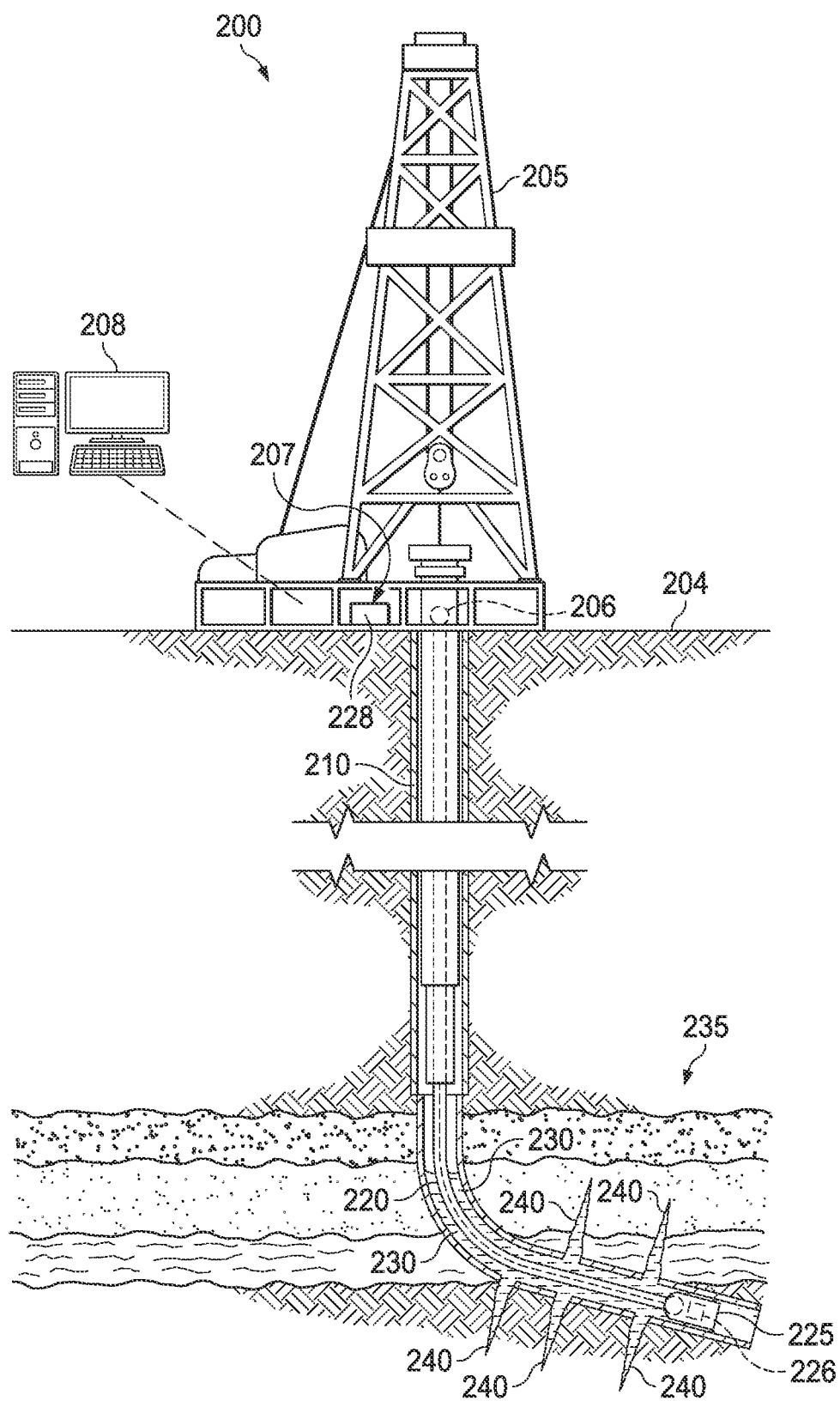
FIG. 2 is an illustration of a diagram of an example hydraulic fracturing well system with a RWS.

FIG. 2 is an illustration of a diagram of an example hydraulic fracturing (HF) well system 200 with a RWS, which can be a well site where HF operations are occurring, for example, through the implementation of a HF treatment stage plan. HF well system 200 demonstrates a nearly horizontal wellbore undergoing a fracturing operation. This disclosure can be used with other well operations as well, such as hydrocarbon extraction.

HF well system 200 includes a surface well equipment 205 located at a surface 204, a well site control equipment 207, a surface HF pump system 206, a computing system 208, and a RWS controller 228. In some aspects, well site control equipment 207 is communicatively connected to separate computing system 208, for example, a separate server, data center, cloud service, tablet, laptop, smartphone, or other types of computing systems. Computing system 208 can be located proximate to well site control equipment 207 or located a distance from well site control equipment 207. In some aspects, computing system 208, well site control equipment 207, or other computing system can be utilized to implement RWS controller 228 and the time control processes to direct operations of a RWS 226 located downhole.

Extending below surface 204 from surface well equipment 205 is a borehole 210. Borehole 210 can have zero or more cased sections and a bottom section that is uncased. Inserted into borehole 210 is a fluid pipe 220. The bottom portion of fluid pipe 220 has the capability of releasing downhole material 230, such as carrier fluid with diverter material, from fluid pipe 220 to subterranean formations 235 containing fractures 240. The release of downhole material 230 can be by perforations in fluid pipe 220, by valves placed along fluid pipe 220, or by other release means. At the end of fluid pipe 220 is a downhole tool 225, which can be one or more downhole tools or an end cap assembly. Downhole tool 225 can include RWS 226 with resonating element to measure changes in pressure and temperature as HF fluid is pumped into or out of borehole 210. In some aspects, RWS 226 can be located along the length of fluid pipe 220. In some aspects, there can be more than one RWS 226 located at various positions along the length of fluid pipe 220.

In an alternative aspect, downhole material 230 can be pumped to the surface, such as removing HF fluid or removing hydrocarbon fluids. Downhole material 230 can be pumped through fluid pipe 220 using surface HF pump system 206, downhole tool 225 pumps, or a combination thereof. Computing system 208, well site control equipment 207, RWS 226, RWS controller 228, or other computing system can be used to determine the time interval, by using a time control, to determine when a subsequent excitation of the resonating element should occur. RWS controller 228 is functionally shown as a separate component for clarity of presentation. In other aspects, the functions performed by RWS controller 228 can be part of other computing systems, tools, or devices of well system 200.

FIGS. 1 and 2 depict onshore operations. Those skilled in the art will understand that the disclosure is equally well suited for use in offshore operations. FIGS. 1 and 2 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 3:
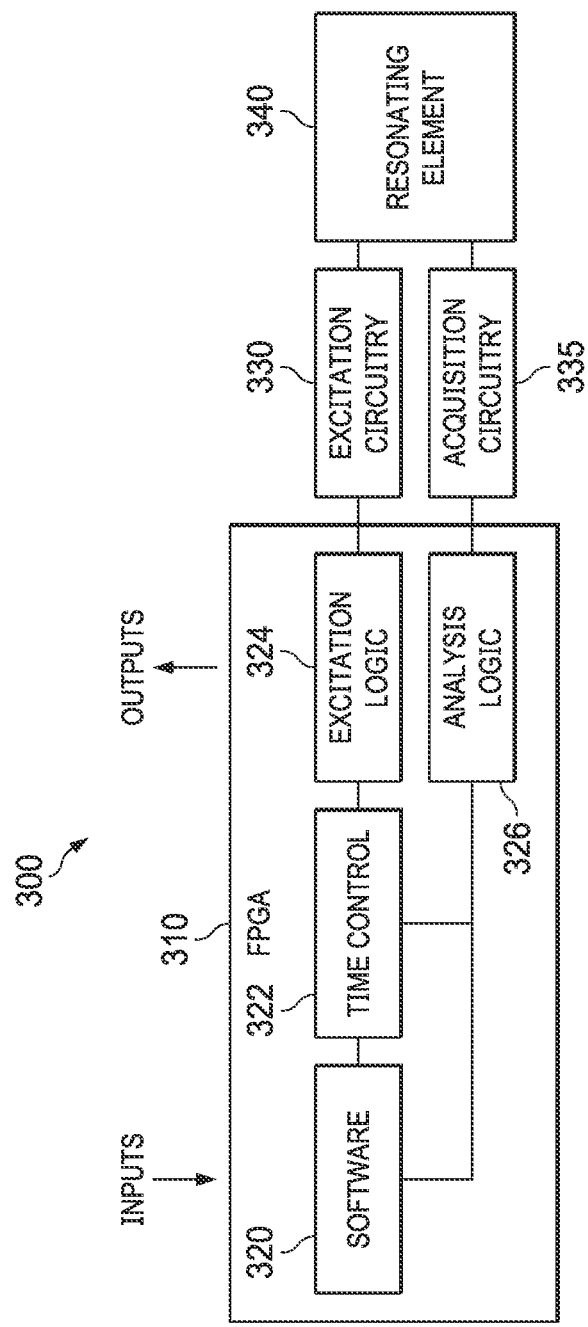
FIG. 3 is an illustration of a block diagram of an example RWS system.

FIG. 3 is an illustration of a block diagram of an example RWS system 300. RWS system 300 is an example of a functional view of one type of RWS that can be deployed. RWS system 300 includes a field programmable gate array (FPGA) 310, an excitation circuitry 330, an acquisition circuitry 335, and a resonating element 340. FPGA 310 further includes a software module 320, a time control 322, an excitation logic controller 324, and an analysis logic controller 326. In an alternative aspect, FPGA 310 can be a microcontroller, a central processing unit (CPU), graphics processing unit (GPU), single instruction multiple data processor (SIMD), or other processor type. In another aspect, portions of FPGA 310 can be separated into more than one circuit, such as a FPGA and a CPU and other combinations.

FPGA 310 demonstrates a functional view and the described functions can be combined or separated in various combinations, for example, time control 322 can be part of software module 320, excitation logic controller 324, or be a separate function. In other aspects, time control 322 can be part of FPGA 310, be a software function, block, dynamic link library, module, or other software component, or be part of hardware circuitry. In some aspects, time control 322 can be a microcontroller, CPU, GPU, or SIMD.

At the initiation of use of RWS system 300, FPGA 310 can receive inputs, such as from a user, a well site controller, or other source. The inputs can be utilized by FPGA 310 to indicate an interval range of sampling frequency for measurements, a time period to take measurements, an energy level or range of energy levels to utilize, and other input information. Depending on the requested frequency of the measurements, such as 10 per second, 100 per second, or 1000 per second, time control 322 can determine a time interval before directing an initiation of subsequent electrical excitations of resonating element 340. FPGA 310 can output the data measured by resonating element 340 (such as the voltages, phases, or amplitudes), analysis performed by the various functional components of FPGA 310 (such as a temperature or pressure parameter), as well as health of the system and other parameters.

Software module 320 can initiate the processes and direct excitation logic controller 324 to initiate an excitation. Excitation circuitry 330, upon receipt of a command from excitation logic controller 324, can initiate an electrical excitation of resonating element 340 at a prescribed energy level, e.g., transmitting electrical energy. Acquisition circuitry 335 can measure the voltage frequency, phase, and amplitude of a voltage signal of resonating element 340, e.g., receiving electrical energy, and can transmit the measurements to analysis logic controller 326. In some aspects, acquisition circuitry 335 can be an analog to digital converter (ADC). In other aspects, acquisition circuitry 335 can be a phase lock loop (PLL). Other acquisition tools and systems can be utilized as well.

Analysis logic controller 326 can receive the voltage signal frequency and amplitude measurements and perform further analysis, such as transforming the measurements into a pressure or temperature parameter. Analysis logic controller 326 can utilize the measurements to predict or estimate an energy value, e.g., using an algorithm to determine a predicted energy value (referred to herein as a "predicted algorithm"), or an algorithm to determine a measured energy value (referred to herein as a "measured algorithm") that can be used to adjust a measurement, e.g., an adjusted measurement. The energy value can be used to compensate the frequency of measurement. In addition, analysis logic controller 326 can adjust the time interval to match the phase of the wire and avoid interference, and can adjust the amount of energy that the excitation logic controller 324 directs for injection in the next excitation to account for the residual energy value. This can assist in reducing jitter, e.g., the residual kinetic energy, from the measured frequency.

In some aspects, analysis logic controller 326 can include a frequency analyzer to perform frequency adjustments and frequency transformations. Analysis logic controller 326, time control 322, or another component can further analyze the amplitude to determine the phase of the received measurement at various time intervals to provide as input for time control 322. The phase analysis of the response can be performed within the software module 320 or analysis logic controller 326. In alternative aspects, the phase analysis and energy value analysis can be performed in other components, such as demonstrated in FIG. 9, flow step 920 and FIG. 10, flow step 1010.

Time control 322 can utilize the phase and other inputs to determine when a subsequent electrical excitation should occur. Time control 322 can direct excitation logic controller 324 to initiate a subsequent electrical excitation at the appropriate time interval such as to avoid or induce constructive or destructive interference between the response and the excitation. The time interval can vary over time as the analysis of the phase can be altered as the pressure or temperature changes at resonating element 340. The time interval can be various time periods, such as at a nano second interval, a second interval, or a smaller or larger time interval. The time interval precision should be sufficient to prevent a significant shift in phase and total energy of the measurements, such as using an interval range of one nano second to ten micro seconds.

Figure 4:
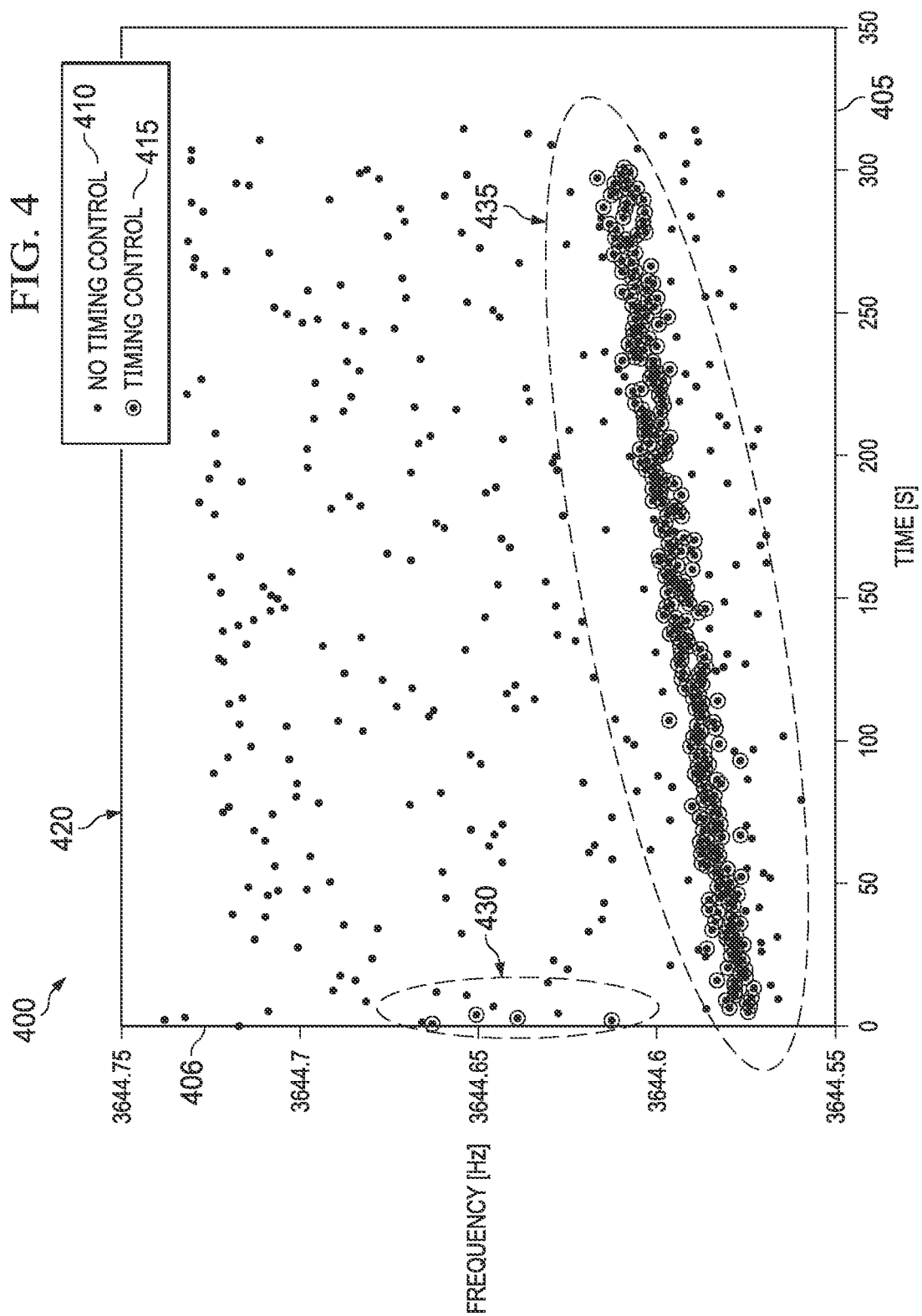
FIG. 4 is an illustration of a diagram of an example graph of measured frequencies.

FIG. 4 is an illustration of a diagram of an example graph 400 of measured frequencies. Graph 400 is demonstrating sample output from a RWS using the disclosed methods and systems. Graph 400 includes an x-axis 405 indicating an elapsed time in seconds from the initial activation of the RWS. Y-axis 406 indicates the measured voltage frequencies as measured from the resonating element of the RWS. Plot area 420 shows the sample data point plots.

Data points 410 indicate the measured frequencies when the resonating element is electrically excited at a time interval that is shorter than the time it takes for the resonating element to come to a full rest with software inter-sample timing. Data points 415 indicate the measured frequencies when the resonating element is electrically excited at a controlled time interval, which is less than the time for the resonating element to come to a complete rest.

Data points 410 are distributed across plot area 420 indicating jitter in the measurements ranging from approximately 3644.56 hertz (Hz) to 3644.74 Hz, which is a differential range of 0.18 Hz. This can lead to lower accuracy of the measurements and subsequently lower accuracy when translating the measurements into pressure or temperature parameters. Data points 415 are grouped into two general collections. Data group 430 are the first four measured data points, which indicate that the process has an initial settle time for the energy losses of the RWS to reach a steady state with the added energy from the subsequent excitations. Data group 435 indicate that once the excitation process has settled, timing subsequent electrical excitations leads to a measurably lower level of jitter, approximately 3 hundredths of a Hz, which is a reduction of the differential range of approximately 0.15 Hz. A fitted line can be utilized to determine the frequency used for further analysis.

Figure 5:
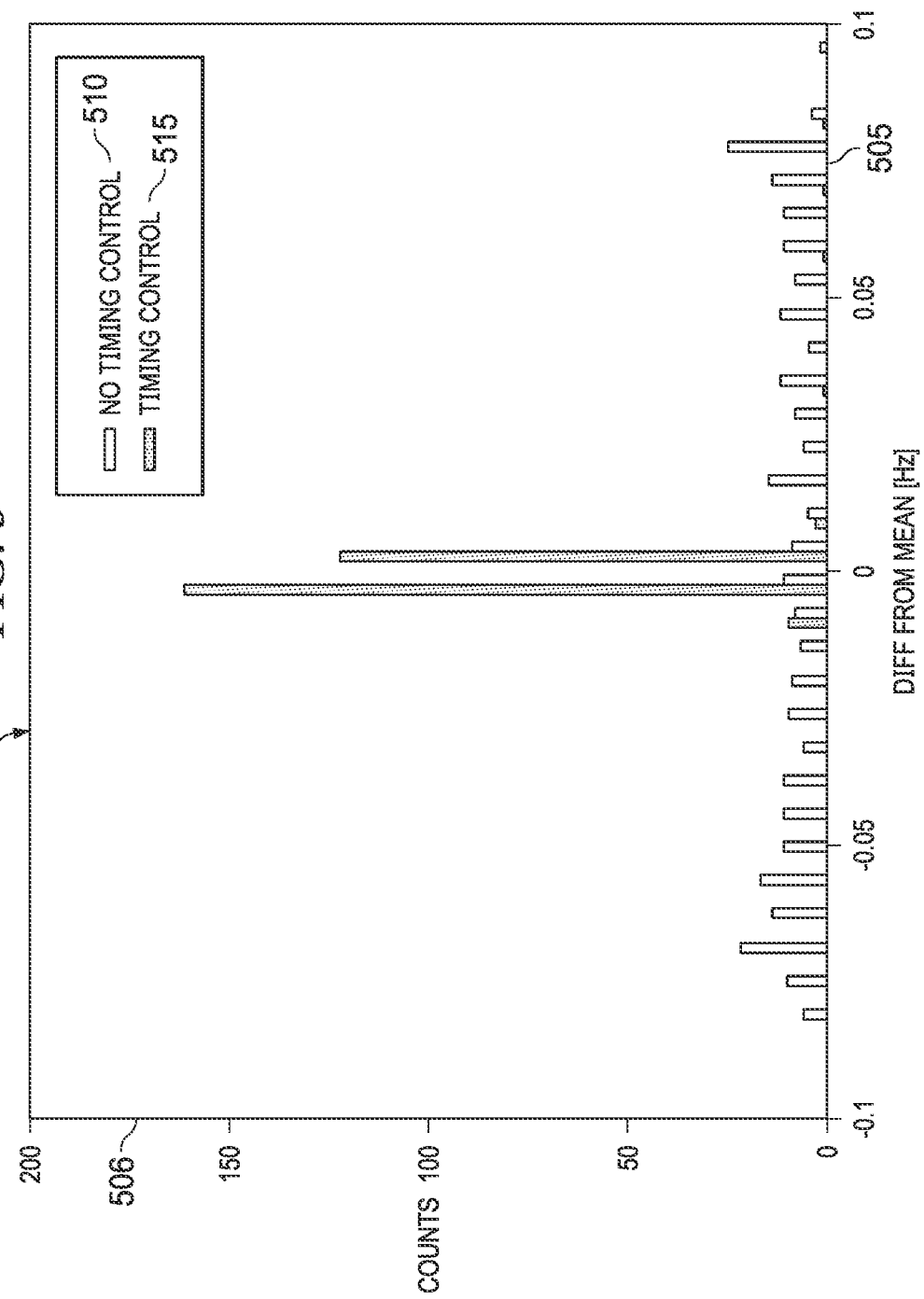
FIG. 5 is an illustration of a diagram of an example histogram of measured frequencies.

FIG. 5 is an illustration of a diagram of an example histogram 500 of the measured frequencies shown in FIG. 4. Histogram 500 demonstrates another view that time control 515 electrical excitation produces a significantly narrower range of frequencies than does non-timed control 510 electrical excitations. Histogram 500 includes an x-axis 505 showing the difference from the mean Hz and a y-axis 506 showing the counts of each frequency.

Plot area 520 shows the plotted histogram data of the data presented in graph 400. Non-timed control 510 has a differential range of approximately −0.08 to 0.1 Hz, for total deviation of 0.18 Hz. Time control 515 has a differential range of approximately −0.02 to 0.08 Hz, for a total deviation of 0.1 Hz. When removing data in data group 430, the total deviation drops to less than 0.04 Hz, which is measurably less than non-timed control 510.

Figure 6:
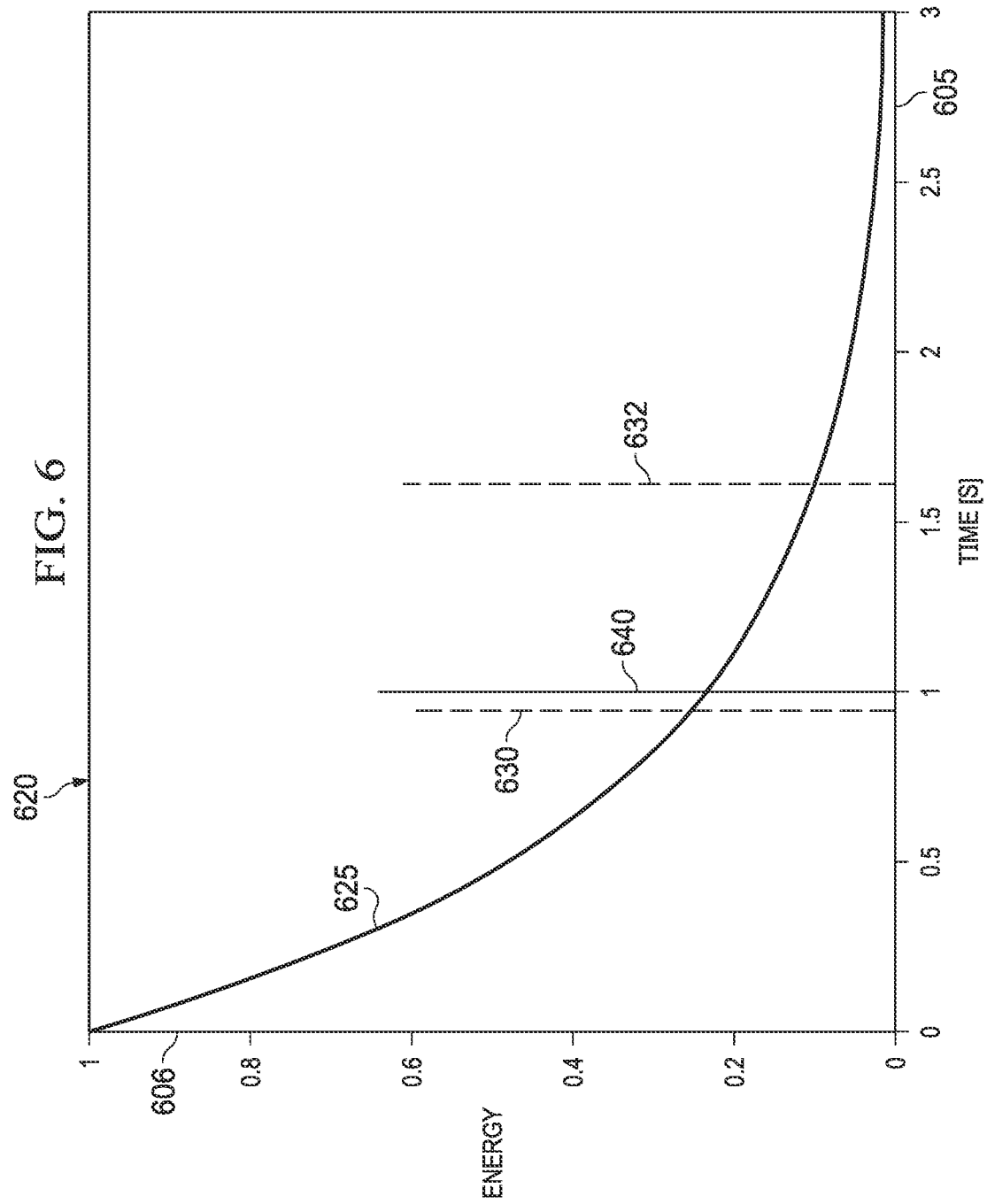
FIG. 6 is an illustration of a diagram of an example chart of an energy window.

FIG. 6 is an illustration of a diagram of an example chart 600 of an energy window demonstrating a target time to initiate a subsequent excitation of the RWS. Chart 600 demonstrates visually how a portion of the process can be utilized. A chart is not necessary for implementation of the methods and systems and is presented here for demonstration and clarity purposes. Chart 600 has an x-axis 605 showing the time in seconds, and a y-axis 606 showing the energy normalized to the initial energy of the wire.

Plot area 620 shows a curve 625 of residual energy in the resonating element. Based on the energy analysis, such as the frequency and amplitude of the voltage detected, a window can be determined, e.g., the time interval, where a re-excitation of the resonating element can occur and residual kinetic energy value and residual potential energy value at the resonating element can be predicted and estimated. The excitation can occur at any time within the time interval. The energy values from the prediction and estimation can be utilized to further modify the measurements received from the acquisition circuitry.

The window has a start time indicated by dashed line 630 and an end time indicated by dashed line 632. The target time for a subsequent excitation is indicated by solid line 640. With a time control the target time interval is achieved with accuracy, allowing the energy value to be predicted at the point where curve 625 and solid line 640 intersect. The received measurements can then be modified to reduce the influence of the non-rest state energy of the resonating element.

Figure 7:
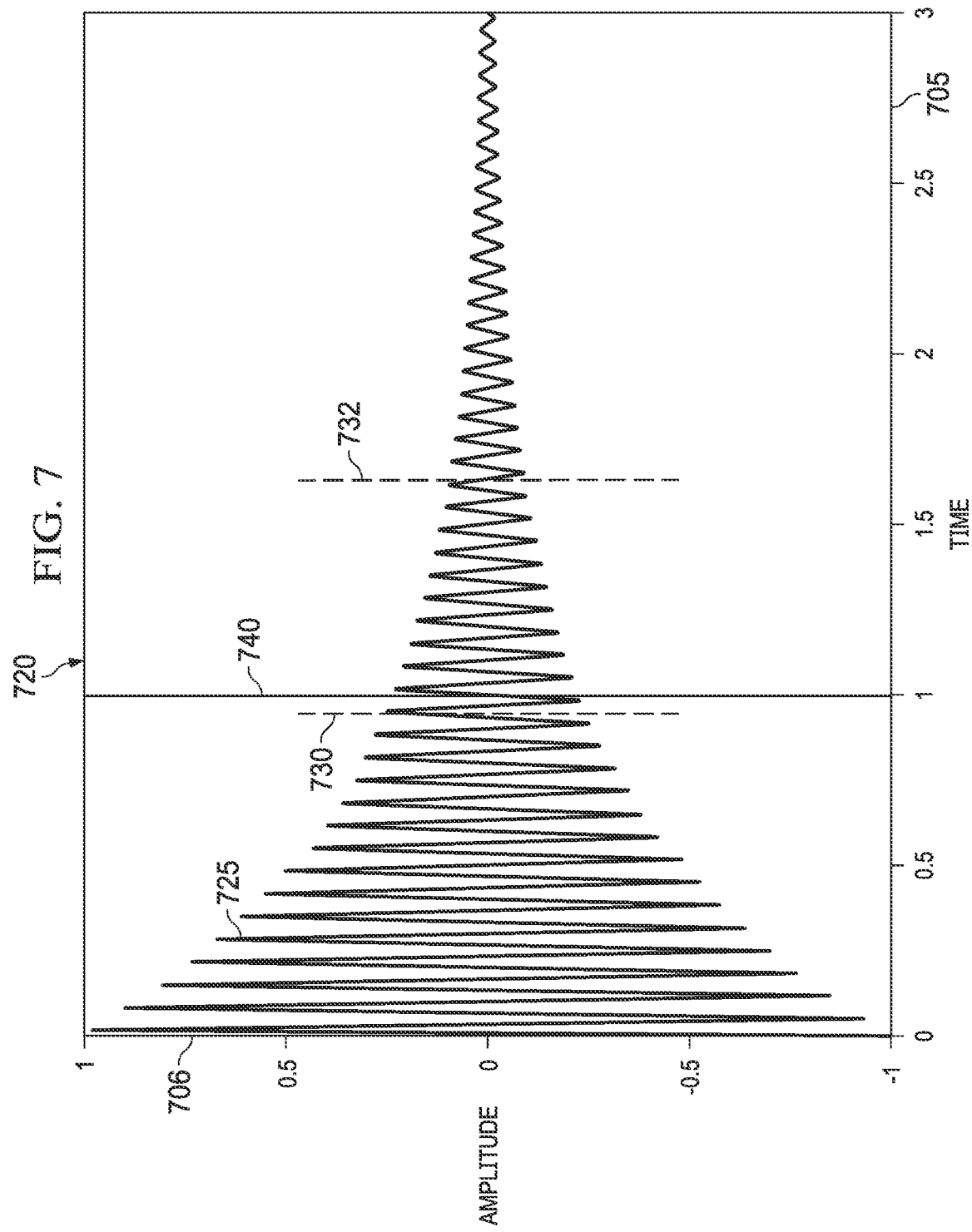
FIG. 7 is an illustration of a diagram of an example chart of a phase window.

FIG. 7 is an illustration of a diagram of an example chart 700 of a phase window demonstrating a target time to initiate a subsequent excitation of the RWS. Chart 700 demonstrates visually how a portion of the process can be utilized. Chart 700 is not necessary for implementation of the methods and systems and is presented for demonstration and clarity purposes.

Chart 700 has an x-axis 705 showing the time in seconds, and a y-axis 706 showing the normalized amplitude of the received voltage. The frequency of the voltage signal has been artificially lowered in chart 700 to enhance clarity. A plot area 720 has an amplitude sine wave 725 shown diminishing over time. A window, e.g., time interval, has been indicated in plot area 720. The window starts at a time indicated by dashed line 730 and ends at a time indicated by dashed line 732. The targeted time for the subsequent excitation of the resonating element is indicated by solid line 740.

The targeted time can be determined based on an analysis of the phase of the voltage signal so that the subsequent excitation can be appropriately aligned in phase with the existing resonance of the resonating element. The interference can be to constructive or destructive, depending on the analysis performed. With inaccurate time control, the window of excitation can span many phase cycles of the response and as a result, unpredictable energy may remain in the wire, increasing measurement to measurement variation.

The time interval determined in FIG. 6 and FIG. 7 is for demonstration purposes and the window determined in an implementation is dependent on the analysis of the environment, equipment being utilized, energy values at previous excitations, and other factors.

Figure 8:
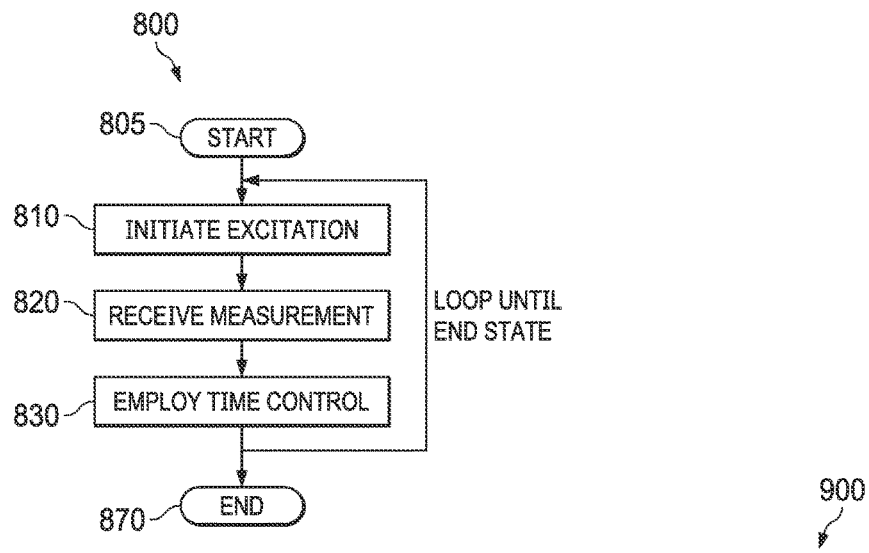
FIG. 8 is an illustration of a flow diagram of an example method using a time control.

FIG. 8 is an illustration of a flow diagram of an example method 800 using a time control. Method 800 can be utilized by a RWS to improve the accuracy of measurements from a resonating element. Method 800 can be implemented by a computing system, such as RWS system 300. Method 800 starts at a step 805 and proceeds to a step 810.

In step 810, the RWS system can receive operating parameters, such as a target measurement frequency, a range of energy levels to use, a time period of operation, and other parameters. Utilizing the received parameters, the excitation logic can initiate an electrical excitation of a resonating element and a new voltage signal frequency can be measured. Proceeding to a step 820, measurements can be received from the resonating element and can be analyzed. In some aspects, an acquisition circuit can be used to collect the measurements and an analysis logic block, circuit, or software can analyze the measurements for the frequency, phase, and amplitude of the measured voltage signal. Auditory or visual information can be used for analyzing the frequency.

In addition, step 820 can predict or estimate an energy value, e.g., a predicted energy value, or determine a measured energy value of the resonating element, such as the residual energy value, e.g., a residual kinetic energy value or a potential energy value. During a subsequent measurement cycle, the residual energy value can be used to adjust the measured frequency to correct for the energy continued to be stored in the resonating element, thereby improving the accuracy of the measured frequency being analyzed. The received measurements can be used to determine a pressure or temperature at the RWS location, such as downhole in a borehole. The collected measurements, the computed temperature or pressure, and other parameters can be communicated to one or more other systems.

In a step 830, a time control can be employed to determine a time interval for initiating a subsequent electrical excitation of the resonating element. The time control can utilize the received operating parameters, e.g., inputs, such as from a user, a well operation plan, or a treatment stage plan, where the input can direct the time control to attempt to satisfy a frequency of measurements taken of the resonating element. The inputs, combined with the analysis of the amplitude, phase, and frequency of the measured voltage signal, can be utilized to determine a time interval before directing the subsequent electrical excitation.

Method 800 loops back to step 810 and can continue processing until an end state has been reached, for example, the time period has passed, a number of measurements taken, equipment is powered down, a stop command is issued, or the process is otherwise ended. Once an end state is satisfied, method 800 ends at a step 870.

Figure 9:
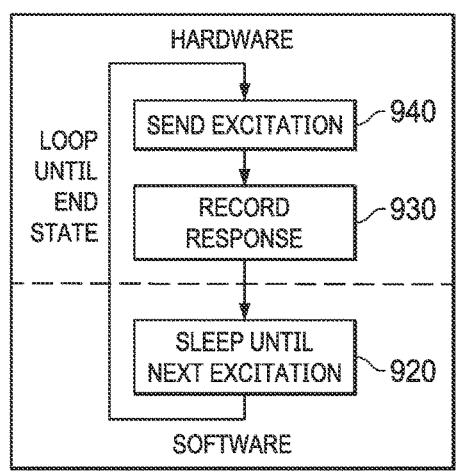
FIG. 9 is an illustration of a flow diagram of an example flow using a software and hardware apparatus.

FIG. 9 is an illustration of a flow diagram of an example flow 900 using a software and hardware apparatus. Flow 900 demonstrates some of the steps implemented in a hardware apparatus, for example, excitation circuitry 330 and acquisition circuitry 335 of RWS system 300, and some of the steps implemented in software, for example FPGA 310 or executing on a microcontroller, a CPU, a GPU, a SIMD, or other processing system.

Flow 900 initiates at flow step 920 where the analysis, time control, and excitation logic is executed. Flow step 920 can be initiated by a command and received operating parameters, such as from user input, a well site controller, or other system. Flow step 920 can send a command to initiate an electrical excitation of resonating element to a flow step 940, such as implemented in excitation circuitry 330. Flow step 940 can perform the excitation process. A flow step 930, such as implemented in acquisition circuitry 335, can record measurements from the resonating element. The measurements can be transmitted to flow step 920 for analysis and to determine the next time interval for a subsequent excitation process. Flow step 920 can also communicate the collected measurements, computed temperature or pressure parameters, and other information to one or more other systems.

Figure 10:
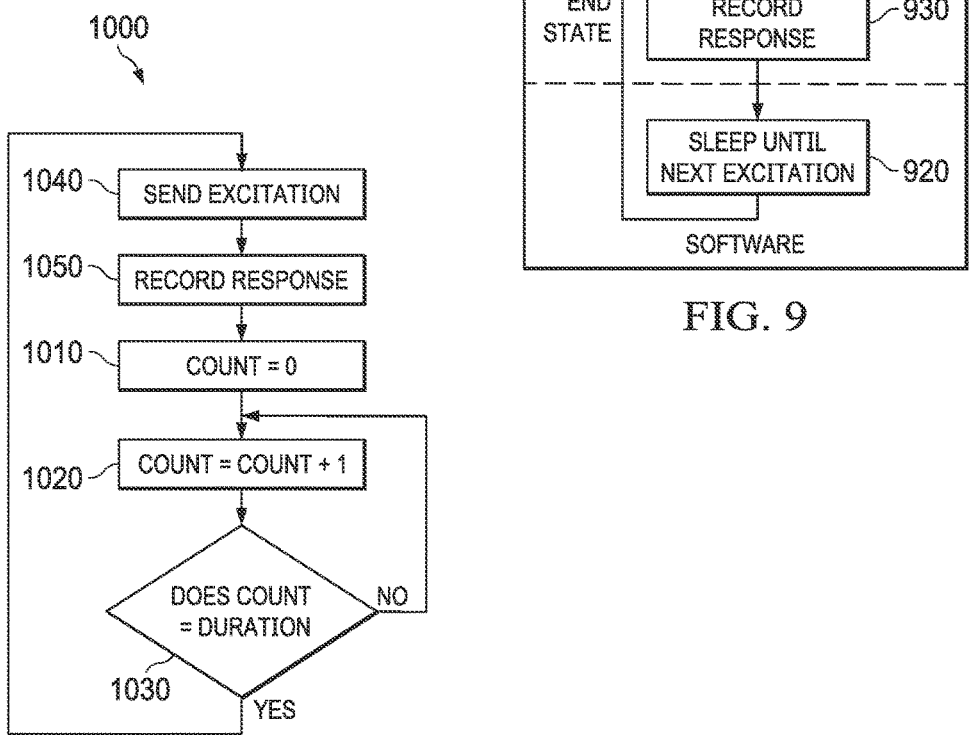
FIG. 10 is an illustration of a flow diagram of an example flow using a hardware apparatus.

FIG. 10 is an illustration of a flow diagram of an example flow 1000 using a hardware apparatus. Flow 1000 can be implemented in one or more hardware modules or systems, such as being part of a RWS or being implemented using interconnected hardware devices. Flow 1000 can be initiated by a command and received operating parameters, such as from user input, a well site controller, or other system.

Flow 1000 can start at a flow step 1010. Flow step 1010 can initiate the logic used by the process, such as setting a count variable to zero. In addition, a duration can be set to an appropriate value. For the first iteration of flow 1000, the duration can be set to one so that an excitation process is initiated immediately. Other values can be used if delays in the process are directed by the process that is starting flow 1000. After the first iteration, flow step 1010 can implement analysis and time control logic as described herein from received measurements from a flow step 1050.

Flow step 1020 can increment the count variable, or other flow control mechanism. In a decision flow step 1030, it can be determined whether a subsequent excitation should occur or a continued delay is appropriate. This decision can be based on the flow control mechanism tracked in flow step 1020. If the decision is 'Yes', a flow step 1040 is performed. If the decision is 'No', flow 1000 returns to flow step 1020 to increment the counter or otherwise update the flow control mechanism.

Flow step 1040 can initiate the excitation process, such as transmitting electrical energy to the resonating element. Flow step 1050 can record measurements taken from the resonating element, such as using acquisition circuitry, and transmit the measurements to flow step 1010. Flow 1000 can continue repeating until an end state is satisfied, such as a count of the number of iterations, a time duration of operation, a command from another system or user, or other end state conditions. Flow step 1010 can communicate the collected measurements, computed parameters and other information to one or more other systems.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a FPGA, or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method of directing an electrical resonating wire sensor (RWS) in a well system, comprising:
    initiating an excitation of a resonating element of the RWS utilizing received operating parameters;
    receiving a measurement generated by the resonating element; and
    employing a time control to set a time interval operable to initiate a subsequent excitation of the resonating element, wherein the time interval is determined using an analysis of the measurement.

2. The method as recited in claim 1, further comprising:
    adjusting a measured frequency of the resonating element from a second execution of the initiating, the receiving, and the employing, utilizing a residual energy value determined from a first execution of the initiating, the receiving, and the employing.

3. The method as recited in claim 2, wherein the residual energy value is one or more of a residual kinetic energy value or a residual potential energy value, and the residual energy value is determined using a measured algorithm or a predicted algorithm.

4. The method as recited in claim 1, further comprising: communicating one or more of the measurement, the time interval, an adjusted measurement, a pressure parameter, or a temperature parameter to one or more of a well site controller, a computing system, or a user.

5. The method as recited in claim 1, wherein the measurement is one or more of an amplitude, a phase, or a frequency of a voltage, and the voltage is measured using the resonating element.

6. The method as recited in claim 5, wherein the analysis of the measurement analyzes the frequency and the amplitude, and the phase is determined from the analysis of the amplitude.

7. The method as recited in claim 5, wherein the analysis of the frequency uses auditory or visual information.

8. The method as recited in claim 5, wherein the frequency can be utilized to determine a pressure or a temperature.

9. The method as recited in claim 1, wherein the time interval utilizes an interval range of one nano second to one second.

10. A system to direct an electrical resonating wire sensor (RWS) in a well system, comprising:
   a resonating element, capable of receiving electrical energy, located in the well system;
   an acquisition circuitry, capable of measuring a frequency, a phase, and an amplitude of the resonating element;
   an excitation circuitry, capable of transmitting electrical energy to the resonating element; and
   a time controller, capable of determining a time interval for the excitation circuitry to transmit electrical energy utilizing received operating parameters.

11. The system as recited in claim 10, further comprising:
   an analysis logic controller capable of predicting or measuring a residual energy value, utilizing an analysis of the frequency or the amplitude, wherein the time controller utilizes the residual energy value to modify the time interval.

12. The system as recited in claim 11, wherein the time controller and the analysis logic controller are implemented as a software block in a control software for the RWS.

13. The system as recited in claim 11, wherein the time controller and the analysis logic controller are implemented in one or more of a field programmable gate array (FPGA), a microcontroller, a central processing unit, a graphics processing unit, or a single instruction multiple data processor.

14. The system as recited in claim 11, wherein the residual energy value is one or more of a residual kinetic energy value or a potential energy value.

15. The system as recited in claim 10, wherein the operating parameters are received from a well site controller, a computing system, or a user input.

16. The system as recited in claim 10, wherein the time controller is located proximate the resonating element.

17. The system as recited in claim 10, wherein the acquisition circuitry utilizes one or more of an analog to digital converter (ADC) or a phase lock loop (PLL).

18. A computer program product having a series of operating instructions stored on a non-transitory computer-readable medium that directs a data processing apparatus when executed thereby to perform operations to direct an electrical resonating wire sensor (RWS) in a well system, the operations comprising:
   initiating an excitation of a resonating element of the RWS utilizing received operating parameters;
   receiving a measurement generated by the resonating element; and
   employing a time control to set a time interval operable to initiate a subsequent excitation of the resonating element, wherein the time interval is determined using an analysis of the measurement.

19. The computer program product as recited in claim 18, the operations further comprising:
   adjusting a measured frequency of the resonating element from a second execution of the initiating, the receiving, and the employing, utilizing a residual energy value determined from a first execution of the initiating, the receiving, and the employing.

20. The computer program product as recited in claim 18, the operations further comprising:
   communicating one or more of the measurement, the time interval, an adjusted measurement, a pressure parameter, or a temperature parameter to one or more of a well site controller, a computing system, or a user.

* * * * *